Figure 1:
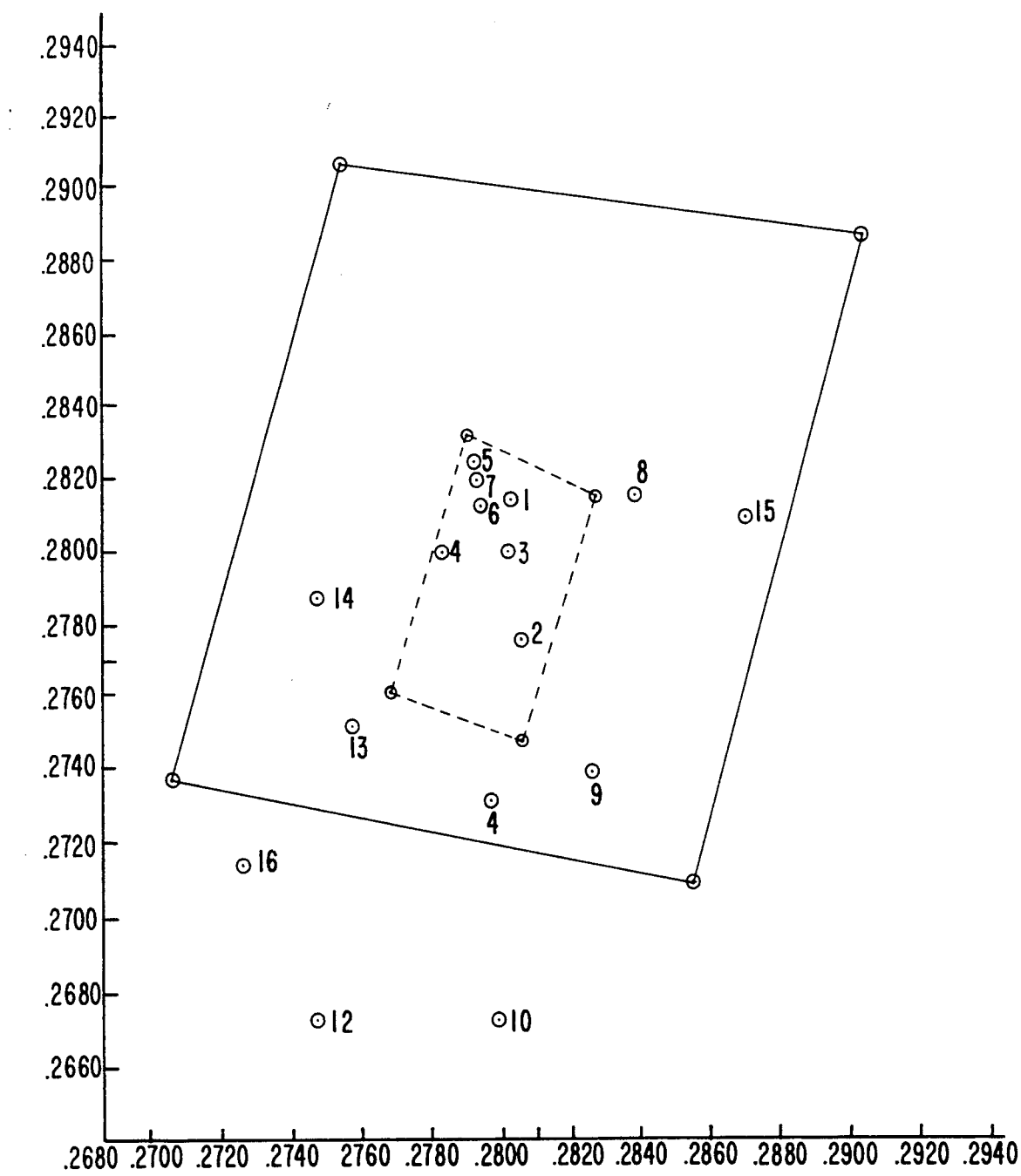

United States Patent [19]

Ciolek et al.

[11] Patent Number: 5,061,659
[45] Date of Patent: Oct. 29, 1991

[54] CONTRAST ENHANCEMENT FILTER GLASS USEFUL FOR COLOR CRT DISPLAYS

[75] Inventors: Sally Ciolek, Luzerne; David Krashkevich, Dallas, both of Pa.

[73] Assignee: Schott Glass Technologies, Inc., Duryea, Pa.

[21] Appl. No.: 563,381

[22] Filed: Aug. 7, 1990

[51] Int. Cl.$^5$ .............................................. C03C 3/095
[52] U.S. Cl. ...................................... 501/64; 313/480
[58] Field of Search ...................... 501/64; 313/480; 252/478

[56] References Cited

U.S. PATENT DOCUMENTS

| | | | |
|---|---|---|---|
| 3,143,683 | 8/1964 | Duncan et al. | 313/480 |
| 4,245,242 | 1/1981 | Trcka | 358/64 |
| 4,288,250 | 9/1981 | Yamashita | 501/64 |
| 4,376,829 | 3/1983 | Daiku | 501/64 |
| 4,390,637 | 6/1983 | Daiku | 501/64 |
| 4,405,881 | 9/1983 | Kobayashi | 313/480 |
| 4,520,115 | 5/1985 | Speit et al. | 501/64 |
| 4,521,524 | 6/1985 | Yamashita | 501/64 |
| 4,769,347 | 9/1988 | Cook et al. | 501/64 |

OTHER PUBLICATIONS

*Handbook of Colorimetry*, Arthur C. Hardy, c. 1936, pp. 9–10.

Primary Examiner—Mark L. Bell
Attorney, Agent, or Firm—Millen, White & Zelano

[57] ABSTRACT

A colored contrast enhancement glass comprises, in wt. %:

| | |
|---|---|
| $SiO_2$ | 40–60 |
| $B_2O_3$ | 0–6 |
| $Al_2O_3$ | 0–2 |
| $\Sigma Li_2O, Na_2O, K_2O = R_2O$ | 24–30 |
| $\Sigma MgO, CaO, SrO, ZnO, BaO = RO$ | 0–10 |
| $TiO_2$ | 1–3.5 |
| $CeO_2$ | 1–3.5 |
| $Nd_2O_3$ | 4–12 |
| $La_2O_3$ | 1–11 |
| $MnO_2$ | 0.1–1.0 |
| $Er_2O_3$ (when included) | 0.2–1.0 |
| $CuO$ | 0.1–0.5 |
| $CoO$ | 0.0005–0.0040 |
| $V_2O_5$ | 0.05–0.50 |
| $Cr_2O_3$ (when included) | 0.0005–0.0300 |
| Photopic % T | 12–24 |
| % T @ 445 nm | 20–30 |
| % T @ 555 nm | 26–36 |
| % T @ 580 nm | 0–3 |
| % T @ 618 nm | 23–35 |
| % T @ 620 nm | 23–34 | having color properties corresponding to values of (x,y) of the larger quadrangle of FIG. 1.

18 Claims, 1 Drawing Sheet

CONTRAST ENHANCEMENT FILTER GLASS USEFUL FOR COLOR CRT DISPLAYS

BACKGROUND OF THE INVENTION

For some time, CRT manufacturers have used filters to obtain contrast enhancement for full color displays. Useful filters transmit light of frequencies corresponding to the phosphor emission frequencies and absorb all other unwanted light. This substantially reduces glare in full sun applications, e.g., when combined with a front surface AR coating. The most commonly used phosphors for color displays at present are P43 and P22. Their primary emission bands are 544 nm (P43) and 445, 525 and 630 nm (P22), etc. Thus, the optimum contrast enhancement filter would have transmission windows of any desired level around these three wavelengths and would be opaque at all other wavelengths.

The first types of contrast enhancement filters utilized were composite filters.

The major disadvantage of a composite filter is the high cost of fabrication. This arises from the necessity to prepare a high optical finish on each of the filter surfaces and because the laminate must be bonded together with optical cements to eliminate Fresnel losses. Another significant disadvantage is the increased weight of a composite filter compared to a single glass filter. A typical prior art composite filter is disclosed in U.S. Pat. No. 4,245,242.

Because of the high fabrication cost of composites, single glasses which combine all required transmission characteristics (as much as possible) have been developed, relying for contrast enhancement primarily on neodymium. Relevant prior art glasses are disclosed in U.S. Pat. Nos. 4,521,524; 4,769,347; 4,288,250; 4,376,829; 4,769,347; 3,143,683; 4,520,115 (concerned with X-ray absorption); 4,405,881; and 4,390,637.

In addition, such prior art glasses also incorporate various colorants such as $CeO_2$, $Sm_2O_3$, $Fe_2O_3$, $CoO$, $NiO$, $CuO$, $Er_2O_3$, $MnO_2$, $V_2O_5$, $Cr_2O_3$, etc. for purposes of obtaining a desired color. The colorants are normally utilized in combinations. $CeO_2$ is also well known as a solarization inhibitor. See, e.g., the above-mentioned patents. Various of these conventional ingredients are also known to absorb short wavelength radiation, e.g., UV radiation, e.g., $CeO_2$, $TiO_2$, etc.

It is usually most difficult to achieve a desired color in such glasses since the colorants are often incompatible and can adversely affect contrast efficiency and since the primary contrast enhancement component, i.e., $Nd_2O_3$, itself is highly colored (purple).

Thus, it is often difficult to achieve the given combination of desired color and contrast enhancement properties for a particular end use, e.g., for the color space shown in FIG. 1.

x, y and z are defined as such by the *Handbook of Colorimetry*, Arthur C. Hardy, c. 1936, pp. 9–10

$$x = \frac{X}{X + Y + Z}$$
$$y = \frac{Y}{X + Y + Z}$$
$$z = \frac{Z}{X + Y + Z}$$

X, Y, Z are the conventional Tristimulus Values

SUMMARY OF THE INVENTION

This invention provides a colored contrast enhancement glass useful, e.g., for achieving a color in the color space of FIG. 1, consisting essentially of, in weight percent:

|  | General | Preferred |
| --- | --- | --- |
| $SiO_2$ | 40–60 | 40–48 |
| $B_2O_3$ | 0–6 | 3–6 |
| $Al_2O_3$ | 0–2 | 0–1 |
| $\Sigma Li_2O, Na_2O, K_2O = R_2O$ | 24–30 | 25–28 |
| $\Sigma MgO, CaO, SrO, ZnO, BaO = RO$ | 0–10 | 3–5 |
| $TiO_2$ | 1–3.5 | 2–3 |
| $CeO_2$ | 1–3.5 | 2–3 |
| $Nd_2O_3$ | 4–12 | 6–8.5 |
| $La_2O_3$ | 1–11 | 4–8 |
| $MnO_2$ | 0.1–1.0 | 0.2–0.8 |
| $Er_2O_3$ (when included) | 0.2–1.0 | 0.3–1.0 |
| $CuO$ | 0.1–0.5 | 0.15–0.40 |
| $CoO$ | 0.0005–0.0040 | 0.0010–0.0035 |
| $V_2O_5$ | 0.05–0.50 | 0.10–0.40 |
| $Cr_2O_3$ (when included) | 0.0005–0.0300 | 0.005–0.0150 |
| Photopic %T | 12–24 | 15–21 |
| %T @ 445 nm | 20–30 | 22.6–28.6 |
| %T @ 555 nm | 26–36 | 30.5–33.5 |
| %T @ 580 nm | 0–3 | 0–2 |
| %T @ 618 nm | 23–35 | 26.3–32.7 |
| %T @ 620 nm | 23–34 | 25.5–31.5 |

The general composition range given above corresponds to the color space of the large quadrangle of FIG. 1 while the preferred range corresponds to that of the smaller quadrangle of FIG. 1. Er and Cr oxides are optional (0–1.0 for $Er_2O_3$ and 0—0.0300 for $Cr_2O_3$). As can be seen, generally the values of x and y are:

| x | 0.2705–0.2900 | 0.2767–0.2825 |
| --- | --- | --- |
| y | 0.2710–0.2910 | 0.2748–0.2835 |

The above color and transmission properties are measured at a nominal thickness of 3.5 mm.

The ranges of glass constituents indicated above are determined by practical glass-making considerations and by their effects on color, contrast and/or transmission properties.

Silica levels of greater than 60 wt % cause melt viscosities and forming temperatures to become undesirably high. Below 40 wt %, chemical durability becomes undesirably low and the necessarily high levels of modifier cations can lead to phase separation or devitrification.

While boric oxide is not necessary to the present invention, its incorporation is desirable in glasses having $SiO_2$ levels within the higher portion of the range in order to reduce melt viscosity to desirable levels. If $B_2O_3$ content is raised above 6 wt %, chemical durability ecreases and the glass becomes more prone to phase separation.

Aluminum oxide is added to enhance chemical durability. If $Al_2O_3$ content is above 2 wt %, there are undesirable increases in melt viscosity.

Alkali is added to control melt viscosity and to stabilize high concentrations of lanthanide ions. If alkali content is below 24 wt %, melt viscosity becomes undesirably high and the glass becomes more prone to phase separation. At alkali levels above 30 wt %, chemical durability becomes undesirably low, and/or needed amounts of other oxides cannot be incorporated $Na_2O$ (e.g., 10–18 wt %) and K$_2$O (e.g., 8–16 wt %) are preferred.

Alkaline earths and zinc are added to improve chemical durability. At levels above 10 wt %, glasses become prone to devitrification and phase separation. BaO is preferred.

TiO$_2$ and CeO$_2$ are added to suppress near-UV. They are each unsatisfactorily effective at levels below 1 wt %. At levels above 3 wt % they tend to increase refractive index above desired levels which typically are less than 1.57. An approximately equimolar combination of TiO$_2$ and CeO$_2$ is a most desirable combination.

Nd$_2$O$_3$ is the primary contrast enhancement ion in the present invention. Its purpose is to give intense multiband absorption which acts to separate the spectral regions of interest. Levels below 4 wt % do not live adequate contrast enhancement. It has been discovered when the amount of Nd$_2$O$_3$ is greater than 12 wt %, a color satisfying the color spec requirements of FIG. 1 is generally not achieved in combination with the other necessary colorants for this invention. At a Nd$_2$O$_3$ content above the preferred value of 8.5 wt %, the ability to achieve the color spec of FIG. 1 becomes more difficult as can be seen by comparing, e.g., Examples 9, 11 and 13 with 10 and 12. Nevertheless, without undue experimentation, the color spec can be achieved throughout the range of Nd of this invention, e.g., by incorporating, less Er$_2$O$_3$ and/or CuO, and/or by increasing the amount of V$_2$O$_5$. The ability of V$_2$O$_5$ incorporations to facilitate attainment of the color spec of this invention is unexpected and can be seen further, for example, by comparing the properties of Example 16 versus those of Examples 4, 5 and 17 per Table 3. Thus, which compositions within the general range of the invention have the desired color properties can be determined routinely without undue experimentation using the guidance of this invention.

These other colorants (in addition to any of the above ingredients which inherently produce color, e.g., Nd) include MnO$_2$, Er$_2$O$_3$, CuO, CoO, Cr$_2$O$_3$ and V$_2$O$_5$. As long as these ingredients are maintained within the defined ranges, satisfaction of the color spec of FIG. 1 can be achieved with at most routine testing. This particular combination of coloring components has not heretofore been suggested as being effective to achieve the desired color characteristics. Glasses meeting the color spec of FIG. 1 are generally bluish-purple.

La$_2$O$_3$ is included in the glass primarily as a replacement for Nd$_2$O$_3$ and also for Er$_2$O$_3$, e.g., to maintain essentially constant rare earth content between compositions where desired thereby minimizing stability effects and changes in optical and/or physical properties with changes in Er or Nd contents.

Copper oxide is added in part to absorb wavelengths above ~650 nm because of the absorption of Cu$^{2+}$. Levels of CuO below 0.1 wt % do not give requisite absorption in this region. Levels above 0.5 wt % reduce the transmission at the 618 or 620 nm phosphor emission wavelength to undesirably low values.

Manganese oxide is added in part to absorb unwanted frequencies in the range 470–500 nm, which is the range of maximum absorption of Mn$^{3+}$. Levels of <0.1 wt % do not provide needed absorption intensity when combined with the other colorants above. At levels above 1.0 wt %, transmission at the 445 and 525 nm phosphor emission wavelengths becomes undesirably low.

It is also possible to include in the glass very minor amounts of conventional colorants where these do not cause the glass to fall outside of the color space achieved with the necessary ingredients recited above. Such conventional colorants, e.g., include those mentioned above and, e.g., Fe$_2$O$_3$, NiO, Cr$_2$O$_3$, in small amounts, e.g., less than 0.030 wt %, preferably less than 0.0005 wt %, etc. These wt % additions are optional intentional inputs into the glass and are not measured trace impurities.

The glasses of this invention can be prepared to use in conventional melting techniques and can be molded into any desired shape using conventional glass handling techniques, e.g., faceplates, windows, lenses, etc., especially for use in full sun applications such as in CRT displays in airplane cockpits. The glasses of this invention can also be coated with conventional coatings such as AR coatings.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application, are hereby incorporated by reference.

The examples disclosed below were melted from conventional glass-making oxide and carbonate/nitrate raw materials in induction-heated platinum crucibles. The mixed batch was typically melted at around 1350° C., refined for three hours at 1450° C. and cast at around 1100° C. Glasses were held for two hours at their individual transition temperatures (T$_g$) being annealed at 30° C./hour to provide stress-free glass.

TABLE 1

| WT % Oxide | 1 | 2 | 3 | 4 | 5 | 6 | 7 | 8 |
|---|---|---|---|---|---|---|---|---|
| SiO$_2$ | 44.63 | 44.26 | 44.27 | 44.42 | 44.40 | 44.40 | 44.40 | 44.77 |
| B$_2$O$_3$ | 5.07 | 5.03 | 5.03 | 5.05 | 5.05 | 5.05 | 5.05 | 5.09 |
| Al$_2$O$_3$ | 1.00 | 1.00 | 1.00 | 1.00 | 1.00 | 1.00 | 1.00 | 1.02 |
| Na$_2$O | 14.20 | 14.08 | 14.08 | 14.13 | 14.13 | 14.13 | 14.13 | 14.15 |
| K$_2$O | 12.27 | 12.17 | 12.17 | 12.21 | 12.21 | 12.21 | 12.21 | 12.21 |
| BaO | 4.06 | 4.04 | 4.04 | 4.04 | 4.04 | 4.04 | 4.04 | 4.07 |
| TiO$_2$ | 2.64 | 2.62 | 2.62 | 2.63 | 2.62 | 2.62 | 2.62 | 2.65 |
| CeO$_2$ | 2.49 | 2.46 | 2.46 | 2.47 | 2.47 | 2.47 | 2.47 | 2.49 |
| MnO$_2$ | 0.34 | 0.754 | 0.754 | 0.756 | 0.756 | 0.756 | 0.756 | 0.33 |
| La$_2$O$_3$ | 5.02 | 4.65 | 4.98 | 5.00 | 5.00 | 5.00 | 5.00 | 5.04 |
| Nd$_2$O$_3$ | 7.49 | 7.42 | 7.42 | 7.45 | 7.45 | 7.45 | 7.45 | 7.41 |

TABLE 1-continued

EXAMPLES (wt. %)

| | | | | | | | | |
|---|---|---|---|---|---|---|---|---|
| Er₂O₃ | 0.338 | 1.00 | 0.671 | 0.336 | 0.336 | 0.336 | 0.336 | 0.339 |
| CuO | 0.18 | 0.35 | 0.35 | 0.35 | 0.35 | 0.35 | 0.35 | 0.17 |
| CoO | 0.0017 | 0.0033 | 0.0033 | 0.0033 | 0.0033 | 0.0033 | 0.0033 | 0.0017 |
| V₂O₅ | 0.24 | 0.15 | 0.15 | 0.15 | 0.18 | 0.18 | 0.18 | 0.24 |
| Cr₂O₃ | 0.015 | — | — | — | — | 0.0010 | 0.0005 | 0.015 |
| color | | | | | | | | |
| x | .2800 | .2804 | .2800 | .2777 | .2790 | .2792 | .2791 | .2836 |
| y | .2817 | .2776 | .2802 | .2805 | .2825 | .2815 | .2822 | .2818 |

| WT % Oxide | 9 | 10 | 11 | 12 | 13 | 14 | 15 |
|---|---|---|---|---|---|---|---|
| SiO₂ | 44.26 | 44.26 | 44.26 | 44.24 | 44.26 | 44.28 | 44.26 |
| B₂O₃ | 5.03 | 5.03 | 5.03 | 5.03 | 5.03 | 5.03 | 5.03 |
| Al₂O₃ | 1.01 | 1.01 | 1.01 | 1.01 | 1.01 | 1.01 | 1.01 |
| Na₂O | 14.08 | 14.08 | 14.08 | 14.08 | 14.08 | 14.09 | 14.08 |
| K₂O | 12.17 | 12.17 | 12.17 | 12.17 | 12.17 | 12.18 | 12.17 |
| BaO | 4.02 | 4.02 | 4.02 | 4.02 | 4.02 | 4.02 | 4.02 |
| TiO₂ | 2.62 | 2.62 | 2.62 | 2.62 | 2.62 | 2.62 | 2.62 |
| CeO₂ | 2.46 | 2.47 | 2.46 | 2.46 | 2.46 | 2.46 | 2.46 |
| MnO₂ | 0.753 | 0.754 | 0.754 | 0.753 | 0.754 | 0.726 | 0.754 |
| La₂O₃ | 1.01 | 1.01 | 2.64 | 1.01 | 2.01 | 4.31 | 4.65 |
| Nd₂O₃ | 11.06 | 11.07 | 9.44 | 11.06 | 11.07 | 8.77 | 7.42 |
| Er₂O₃ | 1.00 | 1.00 | 1.00 | 1.00 | — | — | 1.00 |
| CuO | 0.35 | 0.35 | 0.35 | 0.41 | 0.35 | 0.35 | 0.35 |
| CoO | 0.0033 | 0.0033 | 0.0033 | 0.0033 | 0.0033 | 0.0033 | 0.0017 |
| V₂O₅ | 0.020 | 0.15 | 0.15 | 0.15 | 0.15 | 0.15 | 0.15 |
| Cr₂O₃ | — | — | — | — | — | — | — |
| color | | | | | | | |
| x | .2825 | .2796 | .2796 | .2747 | .2765 | .2745 | .2868 |
| y | .2740 | .2694 | .2733 | .2683 | .2761 | .2788 | .2811 |

Typical properties are indicated in Table 2:

TABLE 2

| | 13 (General) | 3 (Preferred) |
|---|---|---|
| x | 0.2765 | 0.2801 |
| y | 0.2761 | 0.2807 |
| Other valuable properties are: | | |
| Photopic (%T) | 14.7 | 18.4 |
| %T @ 445 nm | 23.1 | 27.0 |
| %T @ 555 nm | 29.2 | 33.0 |
| %T @ 580 nm | 0.2 | 2.0 |
| %T @ 618 nm | 26.2 | 30.2 |
| %T @ 620 nm | 26.8 | 30.8 |

TABLE 3

| Oxide | 16* | 4 | 5 | 1 |
|---|---|---|---|---|
| SiO₂ | 44.48 | 44.42 | 44.40 | 44.63 |
| B₂O₃ | 5.05 | 5.05 | 5.05 | 5.07 |
| Al₂O₃ | 1.00 | 1.00 | 1.00 | 1.00 |
| Na₂O | 14.15 | 14.13 | 14.13 | 14.20 |
| K₂O | 12.23 | 12.21 | 12.21 | 12.27 |
| BaO | 4.05 | 4.04 | 4.04 | 4.06 |
| TiO₂ | 2.63 | 2.63 | 2.62 | 2.64 |
| CeO₂ | 2.48 | 2.47 | 2.47 | 2.49 |
| MnO₂ | 0.757 | 0.756 | 0.756 | 0.340 |
| La₂C₃ | 5.00 | 5.00 | 5.00 | 5.02 |
| Nd₂O₃ | 7.46 | 7.45 | 7.45 | 7.49 |
| Er₂O₃ | 0.337 | 0.336 | 0.336 | 0.338 |
| CuO | 0.35 | 0.35 | 0.35 | 0.18 |
| CoO | 0.0033 | 0.0033 | 0.0033 | 0.0017 |
| V₂O₅ | | 0.15 | 0.18 | 0.24 |
| x | 0.2726 | 0.2777 | 0.2790 | 0.2800 |
| y | 0.2715 | 0.2805 | 0.2825 | 0.2817 |
| Photopic (%) | 17.7 | 18.2 | 18.2 | 18.5 |
| DWL (nm) | 474.2 | 476 | 476 | 475 |
| % Purity | 19.0 | 16.0 | 15.0 | 15.1 |
| 445 nm | 27.5 | 26.2 | 26.2 | 26.5 |
| 555 nm | 30.6 | 32.4 | 32.4 | 33.5 |
| 620 nm | 28.0 | 29.7 | 29.7 | 30.4 |
| Color Space | Out of both color spaces | In both color spaces | In both color spaces | In both color spaces |

TABLE 3-continued

| Oxide | 16* | 4 | 5 | 1 |
|---|---|---|---|---|
| | spaces | | | |

*comparative

The preceding examples can be repeated with similar success by substituting the generically or specifically described reactants and/or operating conditions of this invention for those used in the preceding examples.

From the foregoing description, one skilled in the art can easily ascertain the essential characteristic of this invention, and without departing from the spirit and scope thereof, can make various changes and modifications of the invention to adapt it to various usages and conditions.

What is claimed is:

1. A contrast enhancement glass composition consisting essentially of, in wt %,

| | |
|---|---|
| SiO₂ | 40–60 |
| B₂O₃ | 0–6 |
| Al₂O₃ | 0–2 |
| ΣLi₂O, Na₂O, K₂O = R₂O | 24–30 |
| ΣMgO, CaO, SrO, ZnO, BaO = RO | 0–10 |
| TiO₂ | 1–3.5 |
| CeO₂ | 1–3.5 |
| Nd₂O₃ | 4–12 |
| La₂O₃ | 1–11 |
| MnO₂ | 0.1–1.0 |
| Er₂O₃ (when included) | 0.2–1.0 |
| CuO | 0.1–0.5 |
| CoO | 0.0005–0.0040 |
| V₂O₅ | 0.05–0.50 |
| Cr₂O₃ (when included) | 0.0005–0.0300 |
| Photopic (% T) | 12–24 |
| % T @ 445 nm | 20–30 |
| % T @ 555 nm | 26–36 |
| % T @ 580 nm | 0–3 |
| % T @ 618 nm | 23–35 |
| % T @ 620 nm | 23–34 | having color properties corresponding to values of (x,y) of the larger quadrangle of FIG. 1.

2. A glass of claim 1 consisting essentially of, in wt %,

| | |
|---|---|
| SiO$_2$ | 40–48 |
| B$_2$O$_3$ | 3–6 |
| Al$_2$O$_3$ | 0–1 |
| ΣLi$_2$O, Na$_2$O, K$_2$O = R$_2$O | 25–28 |
| ΣMgO, CaO, SrO, ZnO, BaO = RO | 3–5 |
| TiO$_2$ | 2–3 |
| CeO$_2$ | 2–3 |
| Nd$_2$O$_3$ | 6–8.5 |
| La$_2$O$_3$ | 4–8 |
| MnO$_2$ | 0.2–0.8 |
| Er$_2$O$_3$ (when included) | 0.3–1.0 |
| CuO | 0.15–0.40 |
| CoO | 0.0010–0.0035 |
| V$_2$O$_5$ | 0.10–0.40 |
| Cr$_2$O$_3$ (when included) | 0.005–0.0150 |
| Photopic (%T) | 15–21 |
| %T @ 445 nm | 22.6–28.6 |
| %T @ 555 nm | 30.5–33.5 |
| %T @ 580 nm | 0–2 |
| %T @ 618 nm | 26.3–32.7 |
| %T @ 620 nm | 25.5–31.5 | having color properties corresponding to values of (x,y) of the smaller quadrangle of FIG. 1.

3. A glass of claim 1 having the following properties:

| | |
|---|---|
| Photopic (%T) | 15–21 |
| %T @ 445 nm | 22.6–28.6 |
| %T @ 555 nm | 30.5–33.5 |
| %T @ 580 nm | 0–2 |
| %T @ 618 nm | 26.3–32.7 |
| %T @ 620 nm | 25.5–31.5. |

4. A glass of claim 1 wherein R$_2$O is Na$_2$O and K$_2$O.

5. A glass of claim 1 wherein RO is BaO.

6. A glass of claim 2 wherein R$_2$O is Na$_2$O and K$_2$O.

7. A glass of claim 2 wherein RO is BaO.

8. A glass of claim 4 wherein RO is BaO.

9. A glass of claim 6 wherein RO is BaO.

10. A glass of claim 1 also containing up to 0.0150 wt % Cr$_2$O$_3$.

11. In a color CRT device comprising a color CRT and a filter glass, the improvement wherein the filter glass is one of claim 1.

12. In a color CRT device comprising a color CRT and a filter glass, the improvement wherein the filter glass is one of claim 2.

13. In a color CRT device comprising a color CRT and a filter glass, the improvement wherein the filter glass is one of claim 8.

14. In a color CRT device comprising a color CRT and a filter glass, the improvement wherein the filter glass is one of claim 9.

15. In a color CRT device comprising a color CRT and a filter glass, the improvement wherein the filter glass is one of claim 10.

16. A glass composition of claim 1 containing an amount of Er$_2$O$_3$ in the range of 0.2–1.0 wt. %.

17. A glass composition of claim 1 containing an amount of Cr$_2$O$_3$ in the range of 0.0005–0.0300 wt. %.

18. A glass composition of claim 16 containing an amount of Cr$_2$O$_3$ in the range of 0.0005–0.0300 wt. %.

* * * * *